(12) United States Patent
Onuma (10) Patent No.: US 7,977,838 B2
(45) Date of Patent: Jul. 12, 2011

(54) MAGNETIC LEVITATION MOTOR AND PUMP

(75) Inventor: Hiroyuki Onuma, Iruma (JP)

(73) Assignee: Iwaki Co., Ltd. (JP)

( * ) Notice: Subject to any disclaimer, the term of this patent is extended or adjusted under 35 U.S.C. 154(b) by 82 days.

(21) Appl. No.: 12/255,206

(22) Filed: Oct. 21, 2008

(65) Prior Publication Data
US 2009/0121571 A1 May 14, 2009

Related U.S. Application Data

(63) Continuation of application No. PCT/JP2007/001138, filed on Oct. 18, 2007.

(51) Int. Cl.
*H02K 7/09* (2006.01)
(52) U.S. Cl. .............. 310/90.5; 310/86; 310/216.099
(58) Field of Classification Search ............ 310/68 B, 310/86, 90.5, 216.099
See application file for complete search history.

(56) References Cited

U.S. PATENT DOCUMENTS

| 4,072,370 | A | * | 2/1978 | Wasson | 310/90.5 |
|---|---|---|---|---|---|
| 5,481,146 | A | * | 1/1996 | Davey | 310/90.5 |
| 6,933,644 | B2 | | 8/2005 | Kanebako | |
| 7,683,514 | B2 | | 3/2010 | Onuma et al. | |
| 2009/0079284 | A1 | * | 3/2009 | Onuma et al. | 310/90.5 |
| 2009/0121571 | A1 | * | 5/2009 | Onuma | 310/90.5 |

FOREIGN PATENT DOCUMENTS

| JP | 07-312837 | A | 11/1995 |
|---|---|---|---|
| JP | 2001-323899 | A | 11/1995 |
| JP | 2002-5167 | A | 1/2002 |
| JP | 2006-14528 | A | 1/2006 |
| JP | 2007-120635 | A | 5/2007 |
| WO | WO-2007/049398 | A1 | 5/2007 |

OTHER PUBLICATIONS

"Australian Application Serial No. 2007-352931, Examiner's First Report dated Jan. 5, 2010", 2 pgs.
"International Application Serial No. PCT/JP2007/001138, International Search Report mailed Nov. 20, 2007", (w/ English Translation), 2 pgs.
"International Application Serial No. PCT/JP2007/001138, Written Opinion mailed Nov. 20, 2007", (w/ English Translation), 8 pgs.
"Korean Application Serial No. 10-2008-7026987, Office Action dated Apr. 29, 2010", (w/ English Translation), 6 pgs.
"Japanese Application Seriai No. 2008-529402, Notice of Rejection Grounds mailed May 24, 2011", (w/ English Translation), 6 pgs.

* cited by examiner

*Primary Examiner* — Quyen Leung
*Assistant Examiner* — David W. Scheuermann
(74) *Attorney, Agent, or Firm* — Schwegman, Lundberg & Woessner, P.A.

(57) ABSTRACT

A magnetic levitation motor including a stator having magnetic bearing units and a motor unit, and a rotor provided to the stator. And the occurrence of an eddy current at a magnetic bearing is suppressed and the rotation loss of the rotor can be reduced, and also to provide a pump using such the magnetic levitation motor.

9 Claims, 9 Drawing Sheets

MAGNETIC LEVITATION MOTOR AND PUMP

RELATED APPLICATION

This application is a continuation under 35 U.S.C. 111(a) of International Application No. PCT/JP2007/001138, filed Oct. 18, 2007, which application is incorporated herein by reference and made a part hereof.

TECHNICAL FIELD

The present invention relates to a structure of a magnetic levitation motor and control thereof, and especially to a technique of a hybrid magnetic levitation motor of the double-bias permanent magnet type.

BACKGROUND ART

In recent years, hybridmagnetic levitation motors of the double-bias permanent magnet type have been proposed as magnetic levitation motors.

The five-axis control type hybridmagnetic bearing disclosed in Patent Document 1 is intended to magnetically levitate the major axis rotor and to rotate it highly efficiently under five-axis control by using a bias magnetic flux generation permanent magnet. The magnetic paths are changed so that a magnetic suspension force greater than that of a magnetic levitation system that only uses an electromagnet is generated.

According to Patent Document 2, double-bias type magnetic bearing (suspension control) succeeds in generating a greater magnetic suspension force by using a plurality of bias magnets of a conventional hybrid magnetic bearing. Also, a hybrid magnetic bearing with greater power is realized by inducting the magnetic flux of the secondary bias permanent magnet by using the primary bias permanent magnet.

However, when the technique of Patent Document 1 is used for a pump or the like, the configuration of the inlets and the outlets of the pump becomes complicated because there are salient poles at both ends of the rotor for controlling the axis directional position, which makes the assembly difficult. Also, as the channel for liquid becomes complicated, there is a great loss in sucking and discharging.

Also, in the technique of Patent Document 2, the polarities of the salient poles arranged in the circumferential direction of the magnetic bearing change alternately from S to N and from N to S. Accordingly, an eddy current is caused as the rotor rotates so that the loss of the rotor's rotation becomes great, which is problematic.

Patent Document 1
Japanese Patent Application Publication No. 2006-14528
Patent Document 2
Japanese Patent Application Publication No. 2007-120635

DISCLOSURE OF THE INVENTION

The present invention is achieved in view of the above problems, and it is an object of the present invention to provide a simple magnetic levitation motor in which the occurrence of an eddy current at the magnetic bearing is suppressed and the rotation loss of the rotor can be reduced, and also to provide a pump using such a magnetic levitation motor.

The present invention relates to a magnetic levitation motor including a stator having magnetic bearing units and a motor unit, and a rotor provided to the stator.

The stator has the motor unit between the two magnetic bearing units. Magnetic bearing yokes constituting the magnetic bearing units are arranged at a prescribed interval so as to draw a circle along a side surface of the rotor with a prescribed gap. The magnetic bearing yoke has two salient poles facing the side surface of the rotor. A magnetic bearing coil is wound around one of the salient poles, a first permanent magnet is provided to the other one of the salient poles, and a second permanent magnet is provided between the salient pole provided on the motor unit side and the motor yoke of the motor unit. All the salient poles provided on the motor unit side of said one of the magnetic bearing units are salient poles around which the magnetic bearing coils are wound, or are salient poles to which the first permanent magnets are provided.

All the salient poles provided on the motor unit side of said other one of the magnetic bearing unit are salient poles around which the magnetic bearing coils are wound, or are salient poles to which the first permanent magnets are provided.

The first permanent magnets of the salient poles of said one of the magnetic bearing units, provided so as to face the rotor, have the same polarity on the rotor side. The first permanent magnets of the salient poles of said other one of the magnetic bearing units, provided so as to face the rotor and so as to sandwich the motor unit, have a polarity on the rotor side that is opposite to the polarity on the rotor side in the first permanent magnets of said one of the magnetic bearing units. The second permanent magnet has a polarity on the motor unit side that is the same as the polarity on the rotor side in the first permanent magnets provided to the same magnetic bearing yokes.

Alternately, the first permanent magnets of the salient poles of said one of the magnetic bearing units, provided so as to face the rotor, have the same polarity on the rotor side. The first permanent magnets of the salient poles of said the other one of the magnetic bearing units, provided so as to sandwich the motor unit and so as to face the rotor, have a polarity on the rotor side that is the same as the polarity on the rotor side in the first permanent magnets of said one of the magnetic bearing units. The second permanent magnet has a polarity on the motor unit side that is the same as the polarity on the rotor side in the first permanent magnets provided to the same magnetic bearing yokes.

By the above configuration, it is possible to suppress the occurrence of an eddy current in the magnetic bearing unit in order to reduce the rotation loss in the rotor in a simple configuration.

Desirably, the motor unit has a motor yoke salient pole protruding from the motor yoke in a radial direction of the rotor, having a prescribed gap from the rotor, and having a motor coil wound around the motor yoke salient pole. A motor permanent magnet is provided on a surface of the rotor.

Desirably, the motor unit is of a consequent type.

Desirably, the first permanent magnet is divided and provided to the salient poles.

Desirably, the magnetic bearing coil is wound around each of the salient poles.

Also, a sensor for detecting a position of the rotor is provided to the magnetic bearing unit, and a control current is supplied to the magnetic bearing coil on the basis of a measurement value of the sensor.

Also, the above magnetic levitation motor can be used for a pump.

Also, it may be a magnetic bearing consisting only of the magnetic bearing unit.

BEST MODES FOR CARRYING OUT THE INVENTION (Principle)

The magnetic levitation motor according to the present invention includes a magnetic bearing unit and a motor unit provided on a side wall (inner or outer wall) of a rotor. Also, the magnetic levitation motor according to the present invention includes a stator and a columnar or cylindrical rotor, each of which functions as the magnetic bearing and the motor.

The magnetic bearing unit is in a configuration in which electromagnets having salient poles directed to the rotor's side surface are arranged at a constant interval so that they draw a circle.

Each electromagnet includes a salient pole (second salient pole) having a permanent magnet (first permanent magnet), and another salient pole (first salient pole) around which a magnetic bearing coil is wound.

The motor unit includes motor yokes having salient poles directed to the rotor's side surface, and electromagnets formed by winging motor coils around these salient poles. The second permanent magnet is disposed between an electromagnet of the magnetic bearing unit and an electromagnet of the motor unit.

The first salient pole and the second salient pole of the magnetic bearing unit are aligned in the axial direction. The first permanent magnets of the first salient poles of the magnetic bearing unit are arranged so that the same polarity (south pole or north pole) faces the rotor. The second permanent magnet between the magnetic bearing unit and the motor unit is arranged in such a manner that the same polarity as that of the first permanent magnet facing the rotor faces the motor unit.

Thereby, the double bias configuration is realized in which more bias magnetic fluxes are supplied to the magnetic bearing unit so that the size reduction and higher efficiency can be achieved. Also, the eddy current loss can be reduced since the polarities of the salient poles of the magnetic bearing unit are the same in the circumferential direction.

The attraction of the bias magnetic flux of the permanent magnet at the salient pole in the radial direction of the rotor prevents the rotor from moving in the axial direction and sets the rotor at a prescribed position. In other words, the control can be simplified by causing the rotor to be stabilized passively in the axial direction (passive stability).

Embodiments of the present invention will be explained by referring to the drawings.

EXAMPLE 1

Figure 1:
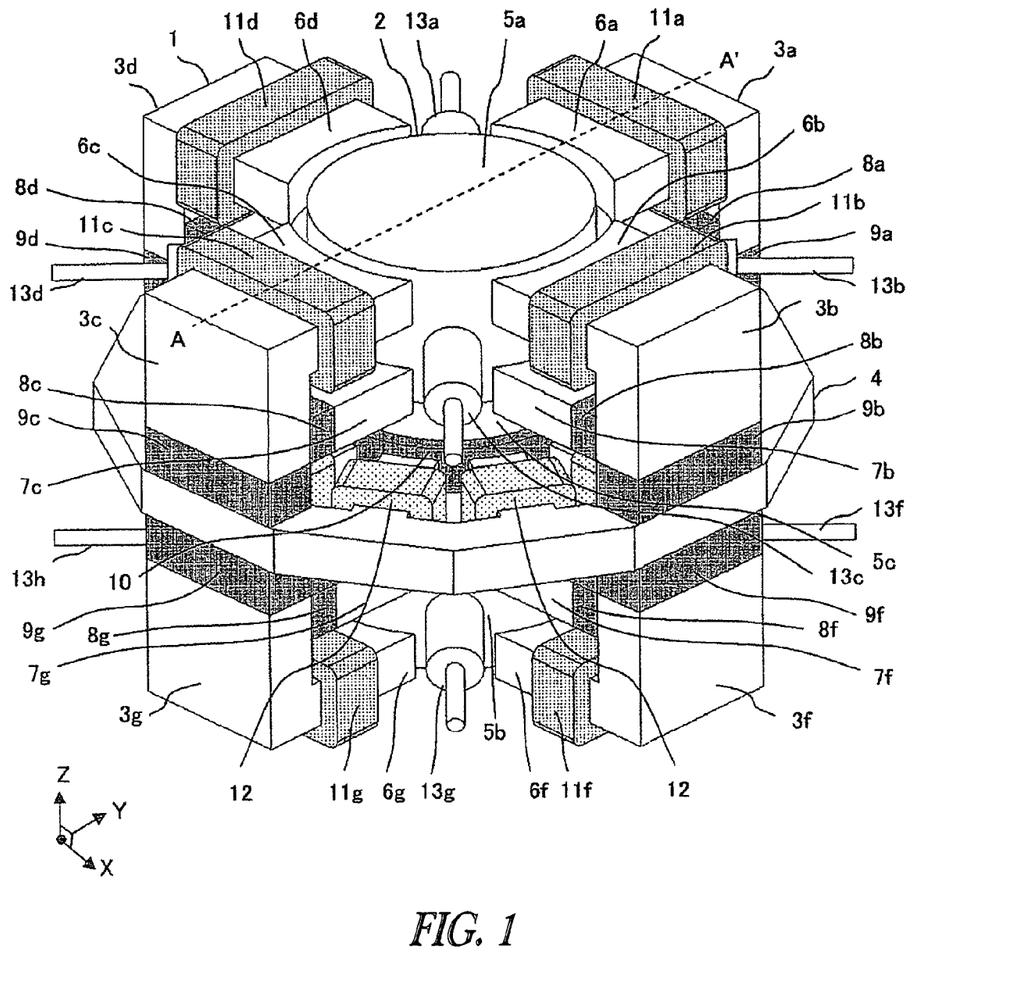
FIG. 1 shows a configuration of example 1 of the present invention.

FIG. 1 shows a configuration of example 1 of the present invention. The magnetic levitation motor includes stators 1 and a rotor 2.

The stator 1 includes a magnetic bearing unit and a motor unit. Numeral 1, which is for the stators, denotes magnetic bearing yokes 3d (that will be described later) for convenience.

The magnetic bearing unit is provided to face the side surface (curved surface) of the cylindrical rotor 2 at a prescribed gap.

The magnetic bearing unit has magnetic bearing yokes 3 (3a through 3h) In this example, the magnetic bearing yokes 3a and 3e sandwiches a motor yoke 4, the magnetic bearing yokes 3b and 3f sandwiches the motor yoke 4, the magnetic bearing yokes 3c and 3g sandwiches the motor yoke 4, and the magnetic bearing yokes 3d and 3h sandwiches the motor yoke 4.

The magnetic bearing yokes 3 (3a through 3h) have first salient poles 6 (6a through 6h). They are arranged radially around the side surface of the rotor 2 so that they draw a circle at a constant interval. Also, magnetic bearing coils 11 (11a through 11h) are wound around the magnetic bearing yokes 3 (3a through 3h) respectively. It is desirable that the magnetic bearing coils 11 (11a through 11h) be wound around the first salient poles 6 (6a through 6h) respectively. However, the scope of the present invention is not limited to this.

Further, the magnetic bearing yokes 3 (3a through 3h) have second salient poles 7 (7a through 7h) respectively. The second salient poles 7 (7a through 7h) are arranged radially around the side surface of the rotor 2 so that they draw a circle at a constant interval. The second salient poles 7 have first permanent magnets 8 (8a through 8h). The second salient poles 7 are provided so that they respectively correspond to the first salient poles 6. Desirably, the second salient poles 7 and the first salient pole 6 are arranged in parallel.

Also, second permanent magnets 9 (9a through 9h) are provided in the gaps between the salient poles on the motor unit side and the motor yoke 4 in the motor unit for the magnetic bearing yoke 3 respectively.

The first permanent magnets 8 (8a through 8d) of the second salient poles 7 (7a through 7d) are arranged so that the same polarity faces the rotor 2. Also, the first permanent magnets 8 (8e through 8h) of the second salient poles 7 (7e through 7h) are arranged so that the same polarity faces the rotor 2. The first permanent magnets 8 (8a through 8d) and the first permanent magnets 8 (8e through 8h) may be arranged so that the different polarities face the rotor 2.

The second permanent magnets 9 (9a through 9h) are arranged so that the polarity opposite from the polarity of the first permanent magnets 8 facing the rotor faces the motor yoke 4. In this configuration, the second permanent magnets 9 (9a through 9d) are arranged so that the same polarity faces the motor yoke 4. The polarity of the second permanent magnets 9 (9a through 9d) and the second permanent magnets 9 (9e through 9h) facing the motor yoke 4 may be different depending upon the polarity of the first permanent magnets 8 that faces the rotor.

The motor unit has the motor yoke 4, which faces a middle portion 5c on the side surface of the rotor 2 at a prescribed gap. The motor yoke 4 of the motor unit has a salient pole facing the middle portion 5c on the side surface of the rotor 2. Motor coils 12 are wound around the motor yoke 4 and the salient poles. Also, on the middle portion 5c of the rotor 2, a motor permanent magnet 10 that faces the salient pole in the motor unit is provided. Also, it is possible for the motor unit to have the Motor coil 12 on the side surface of the tubular motor yoke 4 so that is it driven by the Lorentz force.

The second salient pole 7 is provided on the side of the motor yoke 4 and the first salient pole 6 is provided on the bottom surface side of the rotor 2 (end surface side). However, they may be provided in the reverse arrangement.

Ferromagnetic materials such as neodymium-iron-boron, samarium-cobalt, samarium-iron-nitrogen, or the like are used for the above described first permanent magnets 8, the second permanent magnets 9, and the motor permanent magnet 10. The material for the magnetic bearing yoke 3, the motor yoke 4 of the stator 1, and the rotor yoke 5 of the rotor 2 is a soft magnetic material such as magnetic soft iron, magnetic stainless-steel, powder magnetic core, silicon steel, or the like. The scope of the present invention is not limited to the above materials.

By changing the orientations of polarities of the first permanent magnets 8 and the second permanent magnets 9, the configurations as described below can be obtained as the configurations for the above example.

CONFIGURATION EXAMPLE 1 OF MAGNETIC BEARING

Figure 2:
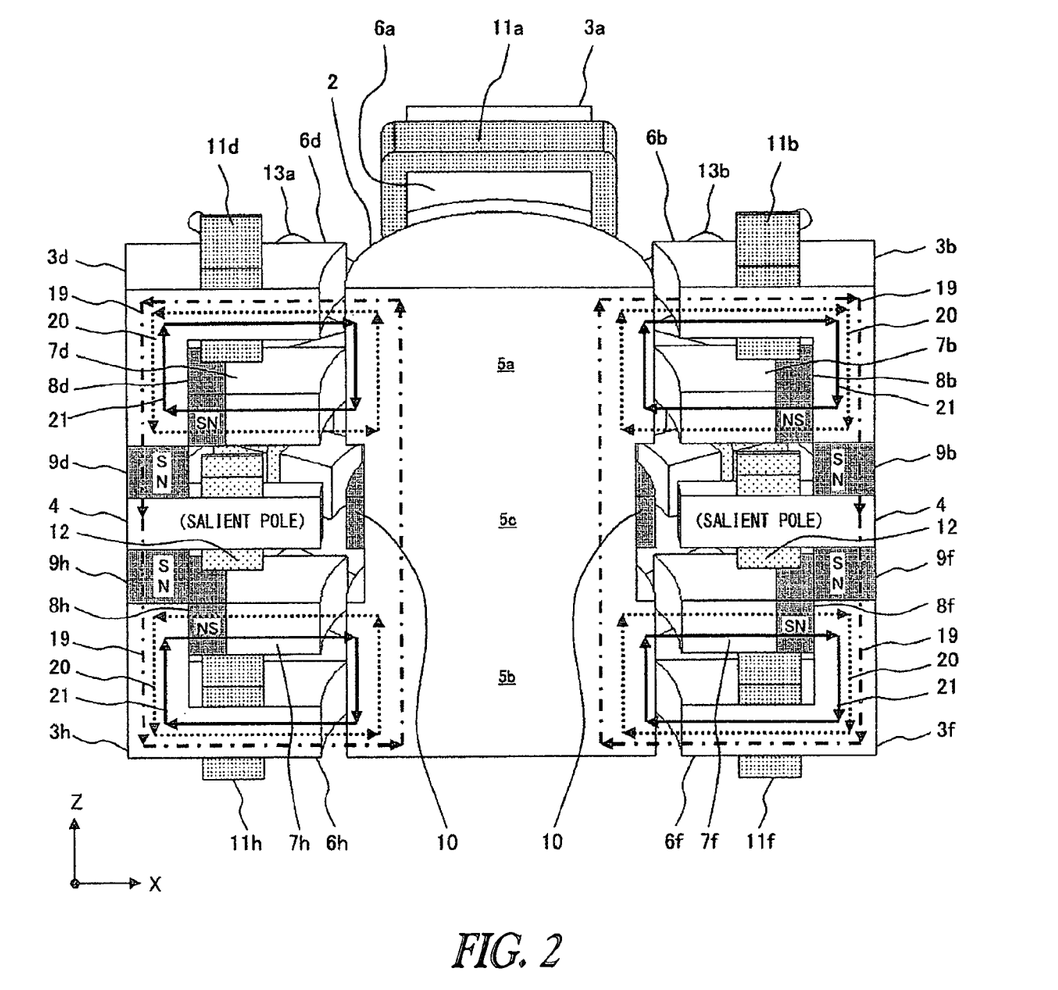
FIG. 2 is a perspective cross-sectional view showing the directions of magnetic flux lines in a configuration in which the polarities on the rotor's side in first permanent magnets 8 (8a through 8d) and the polarities on the rotor's side in first permanent magnets 8 (3e through 8h) are opposite.

As configuration example 1, FIG. 2 shows a configuration in which the polarities on the rotor's side in the first permanent magnets 8 (8a through 8d) and the polarities on the rotor's side in the first permanent magnets 8 (8e through 8h) are opposite. This figure is a perspective-cross-sectional view along the line A-A' of the direction of the flux line.

The second salient poles 7 are arranged on the side of the motor yoke 4, and the first salient poles 6 are arranged on the side of the ends of the rotor 2. However, the first salient poles 6 can be arranged on the side of the motor yoke 4, and the second salient poles 7 can be arranged on the side of the ends of the rotor 2.

As shown in FIG. 2, each of the bias magnetic fluxes 20 of the first permanent magnets 8 forms a magnetic path "-first permanent magnet 8-second salient pole 7-rotor yoke 5-first salient pole 6-". Each of the magnetic fluxes 19 of the second permanent magnets 9 forms a magnetic path "-second permanent magnet 9-motor yoke 4-second permanent magnet 9-first salient pole 6-rotor yoke 5-first salient pole 6-". Each of control fluxes 21 caused by the magnetic bearing coils 11 forms a magnetic flux "-magnetic bearing coil 11-first salient pole 6-rotor yoke 5-second salient pole 7-".

In the gap between the first salient pole 6 and the rotor 2, the bias fluxes 20 and 19 of the first permanent magnet 8 and the second permanent magnet 9 are supplied in a superposed state and in the same direction. In the gap between the first salient pole 6 and the rotor 2, the bias flux that is opposite to the flux supplied to the gap between the second salient pole 7 and the rotor 2 is supplied by the first permanent magnet 8.

The directions of the control fluxes 21 caused in the gaps between the first salient pole 6 and the rotor 2 and between the second salient pole 7 and the rotor 2 are the same as the directions of the respective bias fluxes 19 and 20, being influenced by the directions of the control current (positive or negative), and when the control fluxes 21 flow, the magnetic densities in the respective gaps increase so that the magnetic attractions applied to the rotor 2 in the directions of the above salient poles increase.

By contrast, when the respective bias fluxes 19 and 20 flow in the other direction in the gaps between the first salient pole 6 and the rotor 2 and between the second salient pole 7 and the rotor 2, the magnetic densities in the respective gaps decrease so that the magnetic attractions applied to the rotor 2 in the directions of the above salient poles decrease.

The position of the rotor 2 is controlled by adjusting the control current on the basis of values measured by position detection sensors 13 (13a through 13h) of the rotor 2 and by controlling the increase/decrease in the magnetic attractions. For example, when the position of the rotor 2 shifts in the "−X" direction in FIG. 2, control currents in the magnetic bearing coils 11 (11d and 11h) on the "−X" side are caused to flow in such a direction so as to decrease the magnetic densities in the gaps between the first salient poles 6 (6d and 6h) and the rotor yokes 5 and between the second salient poles 7 (7d and 7h) and the rotor yokes 5, and other control currents in the magnetic bearing coils 11 (11b and 11f) on the "+X" side are caused to flow in such a direction so as to increase the magnetic densities in the gaps between the first salient poles 6 (6b and 6f) and the rotor yoke 5 and between the second salient poles 7 (7b and 7f) and the rotor yoke 5. As a result, the sum of the magnetic attractions caused by the first salient poles 6 and the second salient poles 7 is applied to the rotor in the "+X" direction so that the rotor 2 is moved in the "+X" direction.

Also, when the rotor 2 inclines in the counterclockwise direction in FIG. 2, the control currents in the magnetic bearing coils 11 (11b and 11h) are caused to flow in such a direction so as to decrease the magnetic densities in the gaps between the first salient poles 6 (6d and 6f) and the rotor and between the second salient poles 7 (7d and 7f) and the rotor, and the control currents in the magnetic bearing coils 11 (11b and 11h) are caused to flow in such a direction so as to increase the magnetic densities in the gaps between the first salient poles 6 (6b and 6h) and the rotor and between the second salient poles 7 (7b and 7h) and the rotor. As a result, the sum of the magnetic attractions caused by the respective first salient poles 6 and the second salient poles 7 generates torque in the clockwise direction in order to return the rotor 2 to the original position.

As described above, by adjusting the direction and the amount of control currents applied to the magnetic bearing coils 11 on the basis of values measured by the position detection sensors 13 (13a through 13h) of the rotor 2, the position in the radial direction and the inclination of the rotor 2 can be controlled.

The bias flux 19 of the second permanent magnet 9 flows through the motor yoke 4, but does not flow into the gap between the motor yoke 4 and the rotor 2, and accordingly it does not interfere with the driving of the rotor 2.

CONFIGURATION EXAMPLE 2 OF MAGNETIC BEARING

Figure 3:
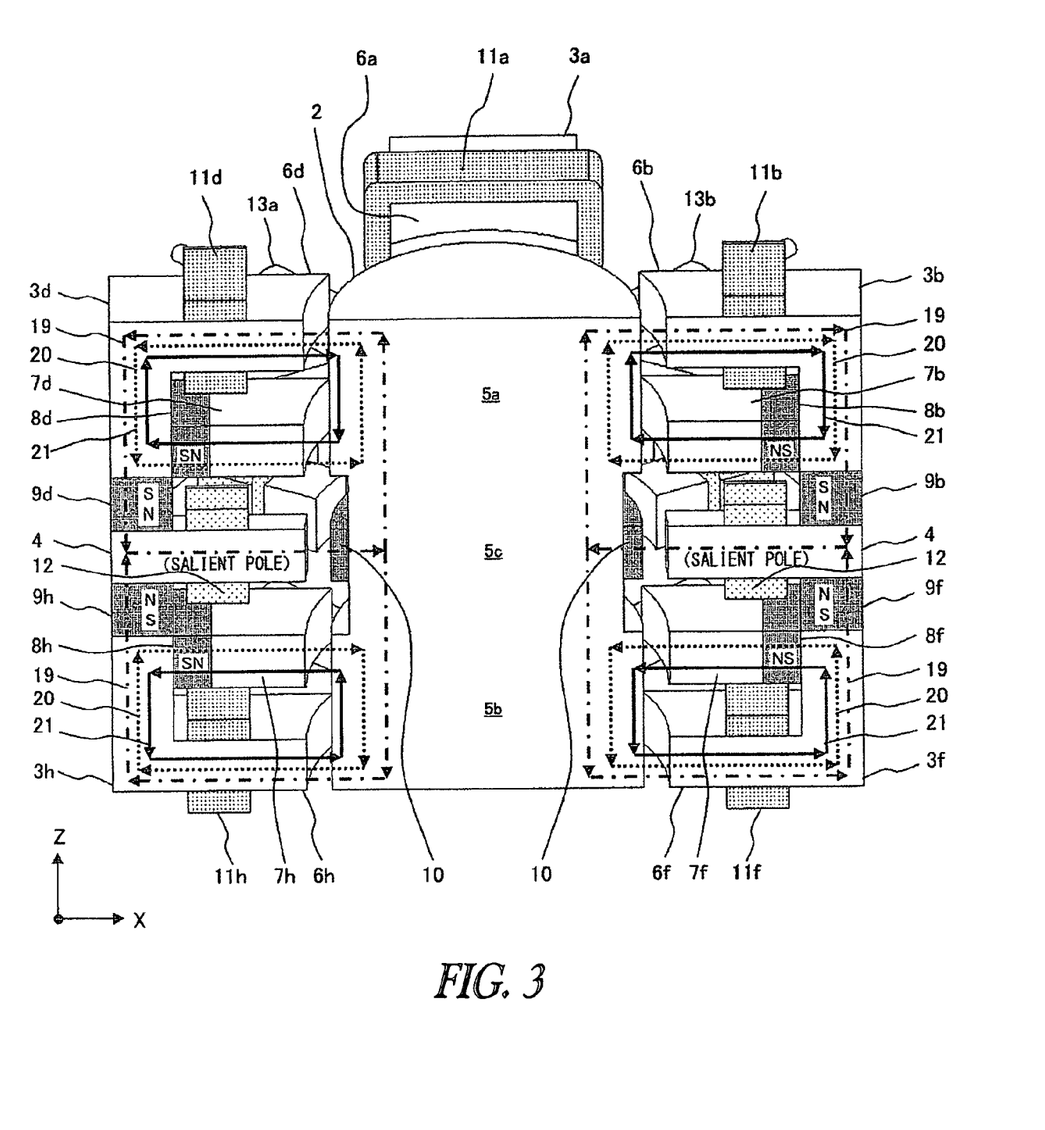
FIG. 3 is a perspective cross-sectional view showing the directions of magnetic flux lines in a configuration in which the polarities on the rotor's side in the first permanent magnets 8 (8a through 8d) and the polarities on the rotor's side in the first permanent magnets 8 (3e through 8h) are the same.

As configuration example 2, FIG. 3 shows a configuration in which the polarities on the rotor's side in the first permanent, magnets 8 (8a through 8d) and the polarities on the rotor's side in the first permanent magnets 8 (8e through 8h) are the same. This figure is a perspective-cross-sectional view along the line A-A' of the direction of the flux line.

In configuration 2, the polarity on the rotor's side in the first permanent magnets 8 and the polarity on the motor yoke 4 side in the second permanent magnets 9 are both north pole. However, the polarity on the rotor's side in the first permanent magnets 8 and the polarity on the motor yoke 4 side in the second permanent magnets 9 may both be the south pole.

The second salient poles 7 are arranged on the side of the motor yoke 4 and the first salient poles 6 are arranged on sides of both ends of the rotor 2; however, the first salient poles 6 may be arranged on the side of the motor yoke 4, and the second salient poles 7 may be arranged on the sides of both ends of the rotor 2.

In FIG. 3, each of the bias magnetic fluxes 20 of the first permanent magnets 8 flows through the magnetic path of "-first permanent magnet 8-second salient pole 7-rotor yoke 5-first salient pole 6-". Each of the bias fluxes 19 of the second permanent magnets 9 flows through a magnetic path "-second permanent magnet 9-motor yoke 4-rotor yoke 5-first salient pole 6-". Each of control fluxes 21 caused by the magnetic bearing coils 11 flows through a magnetic flux "-magnetic bearing coil 11-first salient pole 6-rotor yoke 5-second salient pole 7-".

In the gap between the first salient pole 6 and the rotor 2, the bias fluxes 19 and 20 of the first permanent magnet 8 and the second permanent magnet 9 are supplied in a superposed state and in the same direction. In the gap between the first salient pole 6 and the rotor 2, the bias flux that is opposite to the flux supplied to the gap between the second salient pole 7 and the rotor 2 is supplied by the first permanent magnet 8.

The directions of the control fluxes 21 occurred by the magnetic bearing coil 11 caused in the gaps between the first salient pole 6 and the rotor 2 and between the second salient pole 7 and the rotor 2 are the same as the directions of the respective bias fluxes being influenced by the directions of the control current (positive or negative), and when the control fluxes 21 flow, the magnetic densities in the respective gaps increase so that the magnetic attractions applied to the rotor 2 in the directions of the above salient poles increase. In contrast, when the control fluxes 21 flow in the direction opposite to the respective bias fluxes in the gaps between the first salient pole 6 and the rotor 2 and between the second salient pole 7 and the rotor 2, the magnetic densities in the respective gaps decrease so that the magnetic attractions applied to the rotor 2 in the directions of the above salient poles decrease.

The position of the rotor 2 is controlled by adjusting the control current on the basis of values measured by the position detection sensors 13 (13a through 13h) of the rotor 2 and by controlling the increase/decrease in the magnetic attractions. For example, when the position of the rotor 2 shifts in the "−X" direction in FIG. 3, control currents in the magnetic bearing coils 11 (11d and 11h) on the "−X" side are caused to flow in such a direction so as to increase the magnetic densities in the gaps between the first salient poles 6 (6d and 6h) and the rotor 2 and between the second salient poles 7 (7d and 7h) and the rotor 2, and other control currents in the magnetic bearing coils 11 (11b and 11f) on the "+X" side are caused to flow in such a direction so as to decrease the magnetic densities in the gaps between the first salient poles 6 (6b and 6f) and the rotor 2 and between the second salient poles 7 (7b and 7f) and the rotor 2. As a result, the sum of the magnetic attractions caused by the first salient poles 6 and the second salient poles 7 are applied to the rotor in the "+X" direction so that the rotor 2 is moved in the "+X" direction.

Also, when the rotor 2 inclines in the counterclockwise direction in FIG. 3, the control currents in the magnetic bearing coils 11 (11d and 11f) are caused to flow in such a direction as to decrease the magnetic densities in the gaps between the first salient poles 6 (6d and 6f) and the rotor and between the second salient poles 7 (7d and 7f) and the rotor, and the control currents in the magnetic bearing coils 11 (11b and 11h) are caused to flow in such a direction so as to increase the magnetic densities in the gaps between the first salient poles 6 (6b and 6h) and the rotor and between the second salient poles 7 (7b and 7h) and the rotor. As a result, the sum of the magnetic attractions caused by the respective first salient poles 6 and the second salient poles 7 generates a torque in the clockwise direction to order to return the rotor 2 to the original position.

As described above, by adjusting the direction and the amount of control currents 21 applied to the first salient poles 6 and the second salient poles 7 on the basis of values measured by the position detection sensors 13 (13a through 13h) of the rotor 2, the position of the rotor 2 can be controlled.

The bias magnetic fluxes 19 of the second permanent magnets 9 are also supplied to the gaps between the rotor 2 and the motor yoke 4. Accordingly, the motor unit has to be designed with the bias flux of the second permanent magnets 9 taken into consideration.

The surface permanent magnet type, the interior permanent magnet type, the consequent type, etc. using the motor permanent magnet 10 can be employed for the rotor 2 in examples 1 and 2. Also, a stepping motor, a squirrel-cage motor, or the like that doesn't use the motor permanent magnet 10 can be used for the motor unit.

CONFIGURATION EXAMPLE 1 OF ROTOR 2

The case in which the surface permanent magnet type is used for the rotor 2 using a permanent magnet will be explained below.

Figure 4:
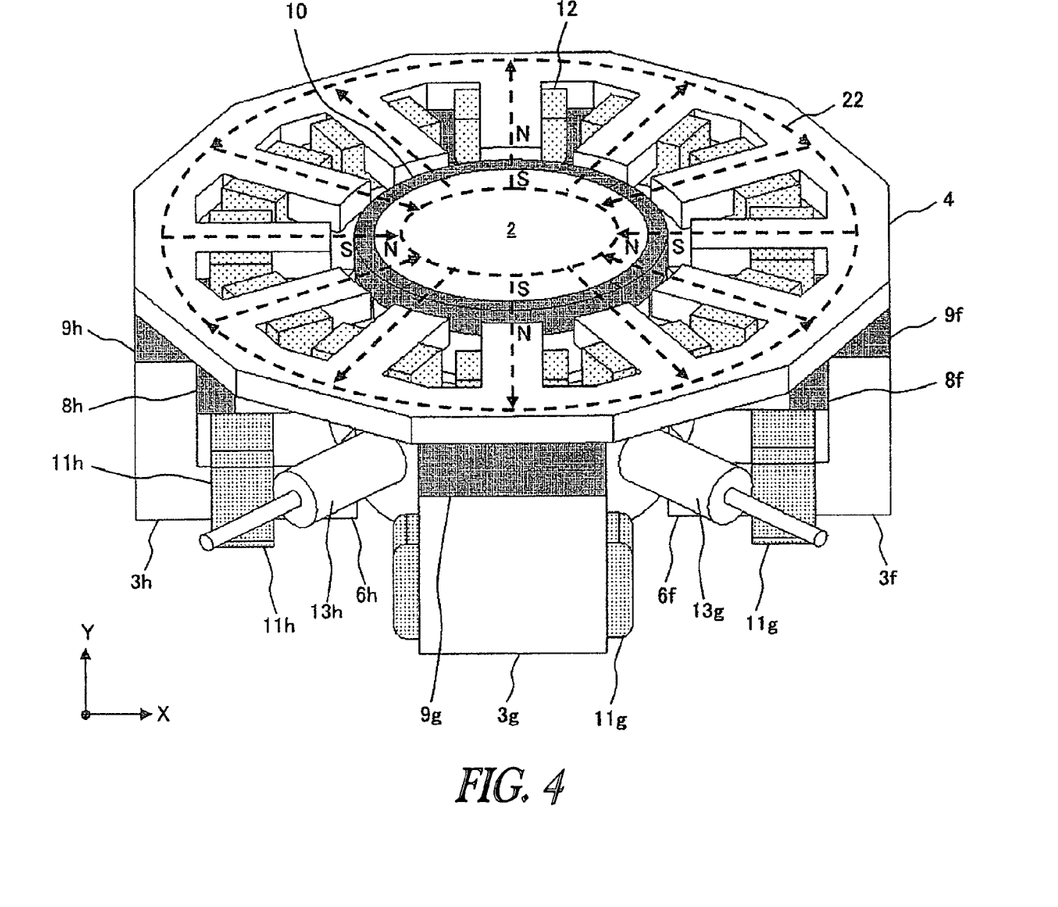
FIG. 4 shows a perspective view along plane X-Y when a rotor employs the configuration of the surface permanent type.

FIG. 4 shows a perspective view along plane X-Y when the rotor 2 employs the configuration of the surface permanent type. In FIG. 4, magnetic paths 22 of the motor permanent magnet 10 are represented by dashed line arrows. The motor unit and the rotor unit in FIG. 4 have the configuration explained in the above "Configuration example 1 of magnetic bearing".

The bias fluxes 19 generated by the second permanent magnets 9 in the configuration example 1 do not flow into the rotor 2 via the salient poles of the motor yoke 4, and accordingly they do not interfere with the motor being driven by the motor permanent magnet 10 or with the negative stiffness (magnetic attraction of a permanent magnet by which the rotor 2 is attracted to the motor unit) in the radial direction of the motor unit.

Also, the bias magnetic fluxes 19 generated by the second permanent magnets 9 in the configuration example 2 flow into the rotor 2 via the salient poles of the motor yoke 4, and an offset occurs in the magnetic flux distribution of the motor permanent magnet 10. Accordingly, when the size and the coercive force of the both motor permanent magnets 10 that are the magnet of the north pole face the motor yoke and the magnet of the south pole face the motor yoke are the same, the strengths of the north pole and the south pole of the motor permanent magnet 10 are different from each other with respect to the negative stiffness in the motor unit.

CONFIGURATION EXAMPLE 2 OF ROTOR 2

Figure 5:
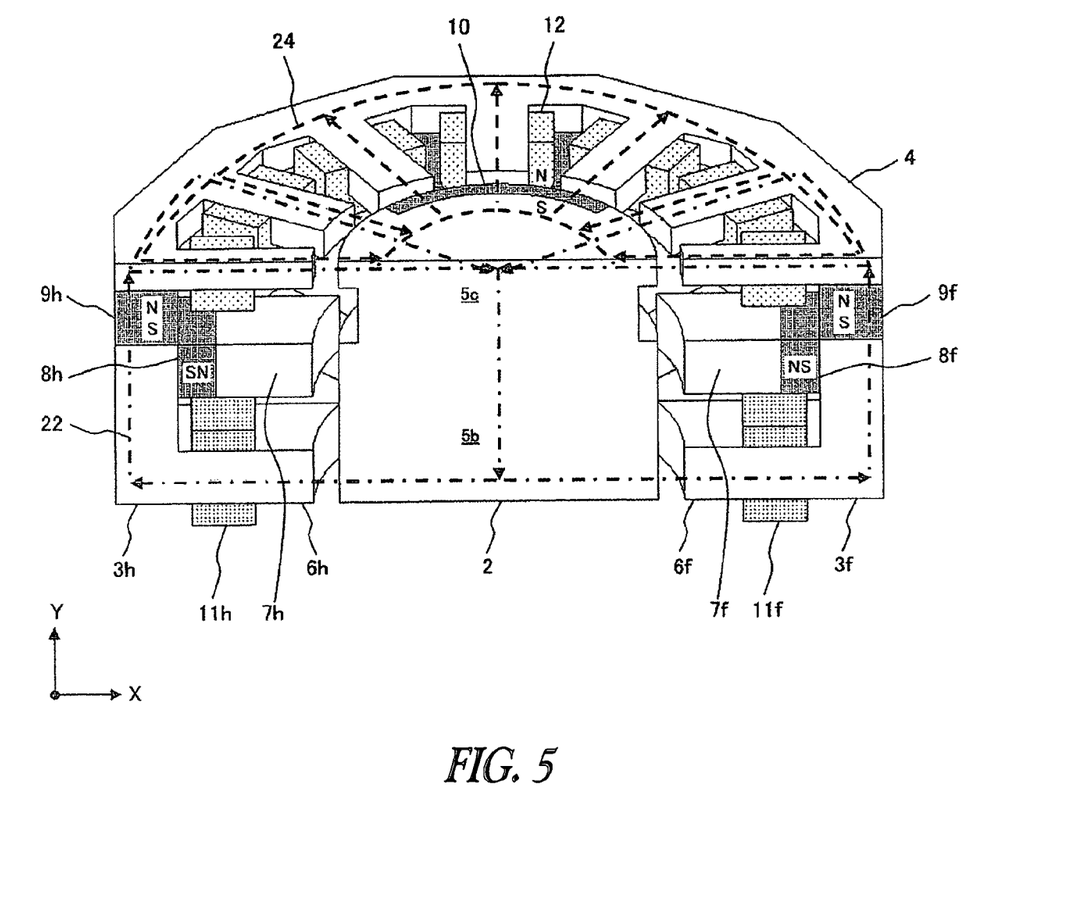
FIG. 5 is a perspective view showing a section along plane X-Y and plane Z-X where the consequent type is employed for the rotor.

FIG. 5 is a perspective view showing a section along plane X-Y and plane Z-X where the consequent type is employed for the rotor 2. In FIG. 5, the magnetic paths of the motor permanent magnets 10 are represented by the dashed line arrows and the magnetic paths of the second permanent magnets 9 are represented by the arrows on the long-dashed short-dashed lines. The permanent magnet in the magnetic bearing shown in FIG. 5 employs the configuration explained in the above configuration example 2 of the magnetic bearing.

In the consequent type, the motor permanent magnets 10 are arranged in the rotor 2 so that the north pole or the south pole faces the motor yoke 4. A plurality of motor permanent magnets 10 are arranged so that the same polarity faces the motor yoke 4.

Also, the rotor yoke 5 is arranged on the surface of the rotor 2 as shown in FIG. 5 instead of arranging permanent magnets around the rotor 2. In this example, the motor permanent magnets 10 are arranged at a ninety degree mechanical angle so that they face each other in the four-pole motor.

A magnetic flux 24 generated from the motor permanent magnet 10 flows through a magnetic path that returns from the motor yoke 4 to the motor permanent magnets 10 via the rotor yoke 5 of the rotor 2. Accordingly, the polarity (the south pole in the present example) opposite to the polarity of the motor permanent magnet 10 facing the motor yoke 4 (the north pole in the present example) faces the rotor yoke 5 of the surface of the rotor 2.

In the consequent type, the magnetic density in the gap between the motor yoke 4 and the rotor 2 is slightly higher than that in the gap of the surface of the permanent magnets. Accordingly, the second permanent magnets 9 are provided as in the configuration example 2. The polarity of each second permanent magnet 9 facing the motor yoke 4 is caused to be the same as the polarity of the motor permanent magnet 10 of the rotor 2 of the consequent type facing the motor yoke 4. In FIG. 5, the north-pole faces the motor yoke 4.

The magnetic path that passes through the rotor yoke 5 on the surface of the rotor 2 has a lower magnetic resistance than the magnetic resistance in the magnetic path passing through the motor permanent magnet 10, and accordingly the bias flux 22 from the second permanent magnet 9 flows from the salient pole of the motor yoke 4 to the rotor yoke 5 on the surface of the rotor 2.

By appropriately designing the second permanent magnet 9, it is possible to make the magnetic flux densities equal to each other between the gap sandwiched by the motor yoke and the permanent magnet surface of the rotor 2 and the gap sandwiched by the rotor yokes 5 on the surface of the rotor 2 on the basis of a flux 24 of the motor permanent magnet 10 and the bias flux 22 of the second permanent magnet 9.

As a result, negative stiffness in the radial direction of the motor unit become equal among one another. Further, the magnetic density in the gap between the rotor yokes 5 on the surface of the rotor 2 increases so that the motor can generate a higher torque.

Also, when the permanent magnets are arranged as in the configuration example 1, the bias flux from the second permanent magnet 9 does not flow to the rotor 2 via the salient pole of the yoke 4, and accordingly the negative stiffness in the motor unit are different in their strength from one another depending upon whether the area has the motor permanent magnet 10 or not.

VARIATION EXAMPLE 1

Figure 6:
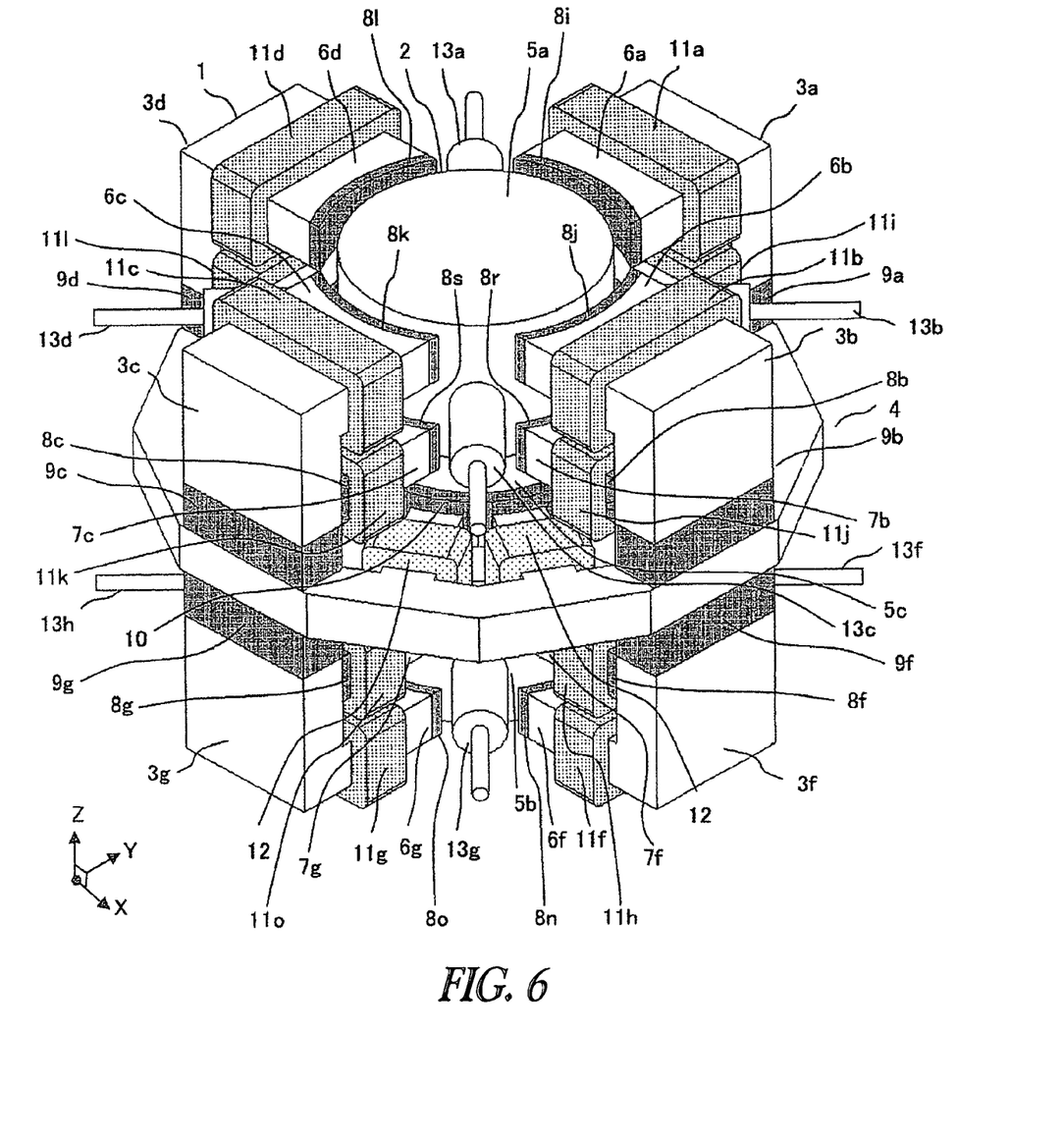
FIG. 6 shows a first variation example for the above example 1.

FIG. 6 shows a first variation example for the above example 1. The leakage of the magnetic flux from magnetic circuits that are not in the gaps between the magnetic bearing unit and the rotor 2 is taken into consideration, and the configuration is changed as described below in order to increase the performance of the magnetic suspension.

Each of the first permanent magnets 8 is divided, and permanent magnets are arranged on the surfaces facing the rotor 2 in the respective first salient poles 6 (6a through 6h) and the second salient poles 7 (7a through 7h) and at the roots of the second salient poles 7 (7a through 7h). In FIG. 6, the first permanent magnets 8 (8i through 8p) are arranged on the first salient poles 6 (6a through 6h). Also, the first permanent magnets 8 (8a through 8h and 8q through 8x) are arranged on the second salient poles 7 (7a through 7h).

The plurality of the first permanent magnets 8 may be arranged at any position on the salient poles; however, the polarities of the permanent magnets facing the rotor 2 on the first salient poles 6 and the polarities of the permanent magnets facing the rotor 2 on the second salient poles 7 are opposite to each other, and the polarities of the magnets on the same salient pole are the same.

It is desirable that the permanent magnets be arranged on the surfaces of the salient poles. However, the arrangement of the permanent magnets is not limited.

In the present example, the first permanent magnets 8 (8i through 8x) are newly arranged on the first salient poles 6 (6a through 6h) and the second salient poles 7 (7a through 7h) by dividing each of the first permanent magnets 8. However, the magnetic suspension force increases even when only the first permanent magnets 8 (8i through 8p) of the first salient poles 6 (6a through 6h) or only the first permanent magnets 8 (8q through 8x) of the second salient poles 7 (7a through 7h) are newly arranged.

In the variation example 1, the magnetic bearing coils 11 are divided and are wound around the first salient poles 6 and the second salient poles 7. In FIG. 6, the magnetic bearing coils 11 (11i through 11p) are wound around the second salient poles 7 (7a through 7h).

VARIATION EXAMPLE 2

Figure 7:
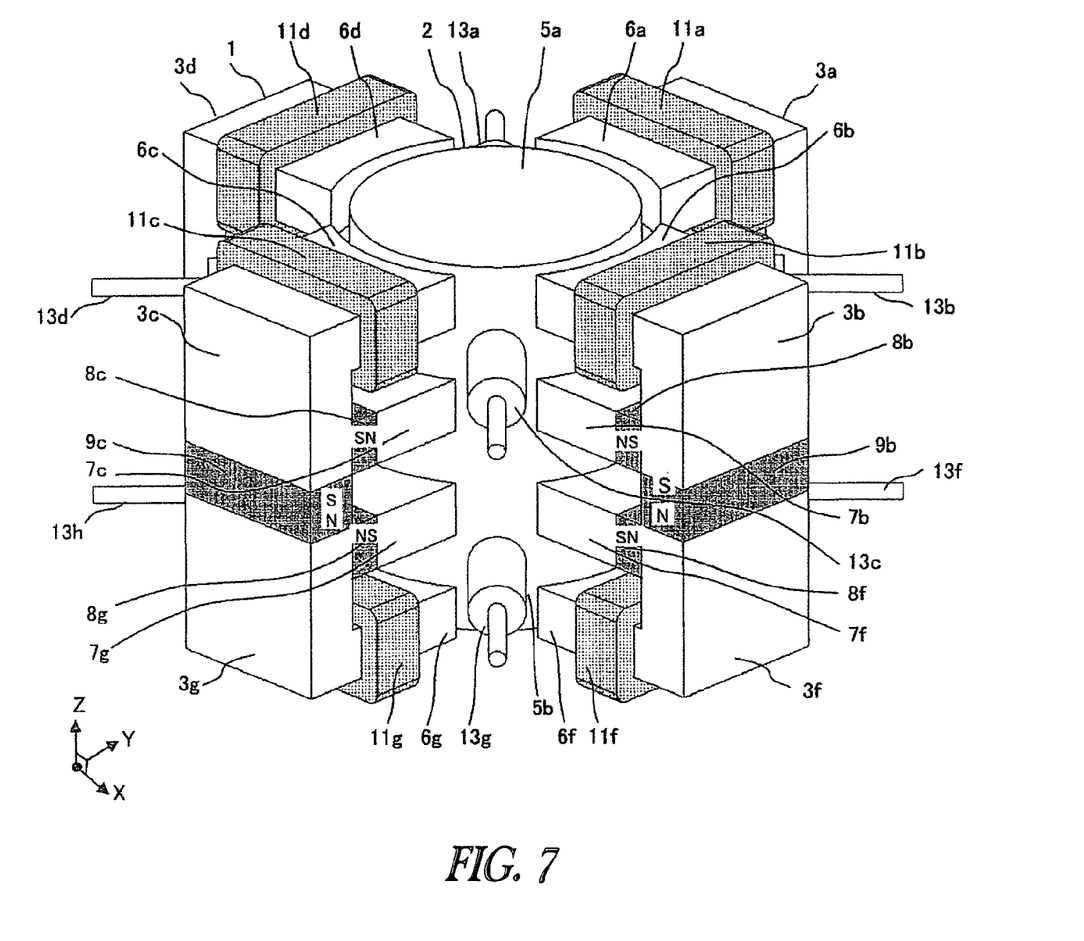
FIG. 7 shows a second variation example of example

FIG. 7 shows a second variation example of example 1. FIG. 7 shows a double-bias magnetic bearing in which the motor yoke 4 is removed and the second permanent magnets 9 are arranged between the electromagnets aligned in the axial direction. The polarity of the first permanent magnets 8 (8a through 8d) in the magnetic bearing facing the rotor 2 and the polarity of the first permanent magnets 8 (8a through 8h) facing the rotor 2 are opposite to each other, and the second permanent magnets 9 are arranged between the electromagnets (the electromagnet consists of the first salient pole 6, the second salient pole 7, the first permanent magnet 8, and the magnetic bearing coil 11) at both ends of the magnetic bearing unit so that the polarity opposite to the polarity of the first permanent magnets 8 facing the rotor 2 faces the rotor 2. It does not have the function of a motor; however, it has the same performance as the magnetic bearing in example 1. Also, it is possible that a part of the rotor 2 has a magnetic coupling so that it is rotated by an external motor.

(Control Unit for Magnetic Bearing Unit)

Figure 8:
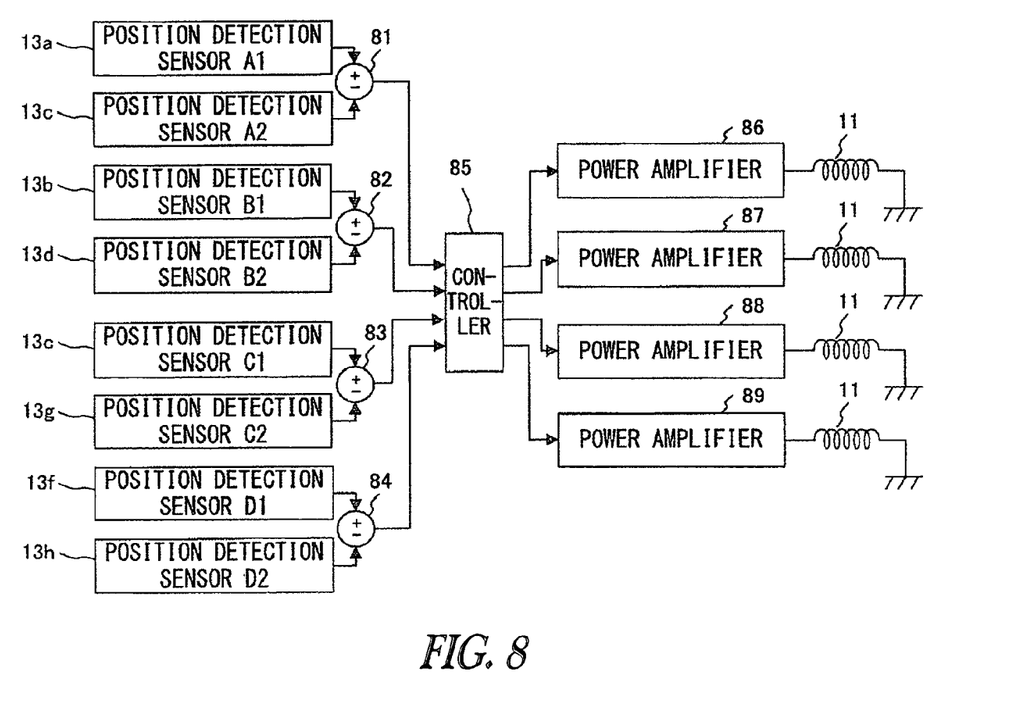
FIG. 8 shows a control unit for a magnetic bearing unit.

FIG. 8 shows a control unit for the magnetic bearing unit of example 1. The position of the rotor in the radial direction is detected by the position detection sensors 13 (13a through 13h) provided at a prescribed position in the radial direction. The magnetic bearing coils 11 facing each other across the rotor are wound around the respective salient poles in the opposite directions, and are connected to power amplifiers. In example 1, eight position detection sensors 13 are provided in the spaces between the magnetic bearing coils 11 of the magnetic bearing unit at a constant interval. The difference between the values output from the two opposing position detection sensors 13 is detected by calculators 81 through 84.

In a controller 85, the coordinate values measured by the position detection sensor 13 are converted into control coordinates of the magnetic bearing coils 11 on the basis of the outputs from the calculators 81 through 84, and current values to be applied to magnetic bearing coils 11 are calculated by using the PID control. The instructions of the current values to be applied to the magnetic bearing coils 11 are given from the controller 85 to power amplifiers 86 through 89, and the currents are applied to the magnetic bearing coils 11 in order to control the position of the rotor 2.

By employing the above configuration, it is possible to increase the detection sensitivity and the linearity, and to expand the detection area.

Desirably, the differential detection by the two position detection sensors 13 facing each other is performed. However, the detection and control can be performed only by one sensor.

In the configuration examples 1 and 2 of the magnetic bearing and in the variation example 2, eight magnetic bearing coils 11 are used; however, it is possible to control the magnetic bearing with only four power amplifiers by winding the magnetic bearing coils 11 facing each other over the rotor around the respective salient poles in the reverse direction.

In variation example 1, sixteen magnetic bearing coils 11 are used, and the directions of winding the magnetic bearing coils 11 around the first salient poles and around the second salient poles are opposite to each other. These magnetic bearing coils 11 are wound around the first and second salient poles so that the directions of the winding are opposite between the first and second salient poles arranged to face each other over the rotor. By connecting the magnetic bearing coils 11, the magnetic bearing can be controlled with only four power amplifiers.

Also one power amplifier can be used for each of the magnetic bearing coils even though this configuration requires a greater number of power amplifiers.

APPLICATION EXAMPLE 1

Figure 9:
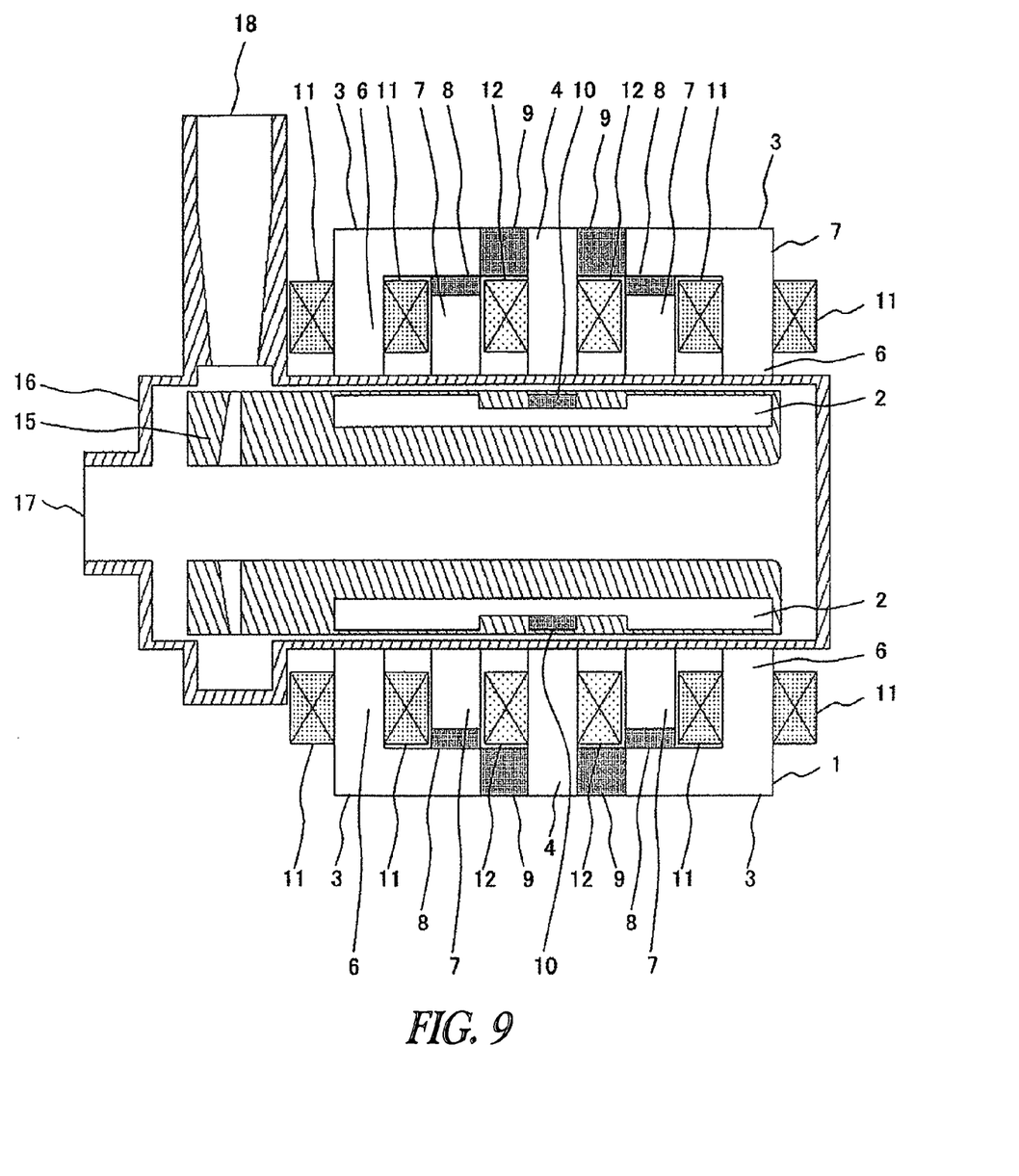
FIG. 9 shows an application of example 1 in which a pump is configured by using the magnetic levitation motor according to example 1.

FIG. 9 shows application example 1 in which a pump is configured by using the magnetic levitation motor according to example 1. FIG. 9 is a cross-sectional view.

In this example, the rotor 2 is covered with resin, nonmagnetic metal, etc., and an impeller 15 is made of resin, nonmagnetic metal, etc. at one end of the rotor 2.

The stator 1 covers a pump casing 16 made of resin, nonmagnetic metal, etc. The rotor 2 and the impeller 15 are arranged in the pump casing 16 so that there is a prescribed gap between them.

The scope of the present invention is not limited to any of the above embodiments, and various modifications and alterations are permitted without departing from the spirit of the present invention.

The invention claimed is:

1. A magnetic levitation motor including a stator having magnetic bearing units and a motor unit, and a rotor provided to the stator, wherein:
   the stator has the motor unit between the two magnetic bearing units;
   magnetic bearing yokes constituting the magnetic bearing units are arranged at a prescribed interval so as to draw a circle along a side surface of the rotor with a prescribed gap;
   the magnetic bearing yoke has two salient poles facing the side surface of the rotor;
   a magnetic bearing coil is wound around one of the salient poles, a first permanent magnet is provided to the other one of the salient poles, wherein for each of the two magnetic bearing units a second permanent magnet is provided between the motor yoke of the motor unit and the magnetic bearing unit;
   all the salient poles provided on the motor unit side of said one of the magnetic bearing units are salient poles around which the magnetic bearing coils are wound, or are salient poles to which the first permanent magnets are provided; and
   all the salient poles provided on the motor unit side of said other one of the magnetic bearing units are salient poles around which the magnetic bearing coils are wound, or are salient poles to which the first permanent magnets are provided.

2. The magnetic levitation motor according to claim 1, wherein:
   the first permanent magnets of the salient poles of said one of the magnetic bearing units, provided so as to face the rotor, have the same polarity on the rotor side;
   the first permanent magnets of the salient poles of said other one of the magnetic bearing units, provided so as to face the rotor and so as to sandwich the motor unit, have a polarity on the rotor side that is opposite to the polarity on the rotor side in the first permanent magnets of said one of the magnetic bearing units; and
   the second permanent magnet has a polarity on the motor unit side that is the same as the polarity on the rotor side in the first permanent magnets provided to the same magnetic bearing yokes.

3. The magnetic levitation motor according to claim 1, wherein:
   the first permanent magnets of the salient poles of said one of the magnetic bearing units, provided so as to face the rotor, have the same polarity on the rotor side;
   the first permanent magnets of the salient poles of said other one of the magnetic bearing units, provided so as to sandwich the motor unit and so as to face the rotor, have a polarity on the rotor side that is the same as the polarity on the rotor side in the first permanent magnets of said one of the magnetic bearing units; and
   the second permanent magnet has a polarity on the motor unit side that is the same as the polarity on the rotor side in the first permanent magnets provided to the same magnetic bearing yokes.

4. The magnetic levitation motor according to one of claims 1 through 3, wherein:
   the motor unit:
      has a motor yoke salient pole protruding from the motor yoke in a radial direction of the rotor, having a prescribed gap from the rotor, and having a motor coil wound around the motor yoke salient pole; and
      has a motor permanent magnet on a surface of the rotor.

5. The magnetic levitation motor according to claim 4, wherein:
   the motor unit is of a consequent type.

6. The magnetic levitation motor according to claim 1, wherein:
   the first permanent magnet is divided and provided to the salient poles.

7. The magnetic levitation motor according to claim 1, wherein:
   the magnetic bearing coil is wound around each of the salient poles.

8. The magnetic levitation motor according to claim 1, wherein:
   a sensor for detecting a position of the rotor is provided to the magnetic bearing unit, and a control current is supplied to the magnetic bearing coil on the basis of a measurement value of the sensor.

9. A pump using the magnetic levitation motor according to claim 1.

* * * * *